United States Patent [19]

Siepmann et al.

[11] 4,013,935
[45] Mar. 22, 1977

[54] CIRCUIT ARRANGEMENT FOR A DC TO DC CONVERTER

[75] Inventors: Bernd Josef Siepmann, Geretsried; Peer Thilo, Munich, both of Germany

[73] Assignee: Siemens Aktiengesellschaft, Berlin & Munich, Germany

[22] Filed: Aug. 11, 1975

[21] Appl. No.: 603,679

[30] Foreign Application Priority Data

Sept. 20, 1974 Germany .......................... 2445033

[52] U.S. Cl. ................................................. 321/2
[51] Int. Cl.² ........................................ H02M 3/335
[58] Field of Search ............ 321/2, 4; 331/109, 111

[56] References Cited
UNITED STATES PATENTS

| | | |
|---|---|---|
| 3,564,393 | 2/1971 | Williamson ............................ 321/2 |
| 3,618,130 | 11/1971 | Garuts .................................. 321/2 |
| 3,697,852 | 10/1972 | Gerbitz ................................. 321/2 |
| 3,789,289 | 1/1974 | Bell et al. ............................. 321/2 |
| 3,943,425 | 3/1976 | Kupka et al. ......................... 321/2 |

FOREIGN PATENTS OR APPLICATIONS 1,059,720  2/1967  United Kingdom ................... 321/2

*Primary Examiner*—William H. Beha, Jr.
*Attorney, Agent, or Firm*—Hill, Gross, Simpson, Van Santen, Steadman, Chiara & Simpson

[57] ABSTRACT

A circuit arrangement for a DC to DC converter has at least one switching transistor and one transformer. The transformer includes a primary winding which is connected in the collector circuit of the transistor and a secondary winding from which at least one stabilized DC voltage may be tapped by way of rectifiers. The switching transistor is actuated and blocked by way of a control component in dependence upon load. A voltage comparison device is provided for comparing the collector-emitted voltage of the switching transistor with a predetermined reference value, and upon overshoot of the reference voltage the collector-emitter voltage is analyzed for disconnection of the base current of the switching transistor.

11 Claims, 4 Drawing Figures

CIRCUIT ARRANGEMENT FOR A DC TO DC CONVERTER

BACKGROUND OF THE INVENTION

1. Field of the Invention

This invention relates to a circuit arrangement for a dc to dc converter current supply having at least one switching transistor and one transformer, and more particularly to such a circuit arrangement in which the primary winding of the transformer is connected in the collector circuit of the transistor and the secondary winding provides at least one stabilized dc voltage by way of rectifiers, and wherein the switching transistor is actuated and blocked by way of a control component in dependence upon load.

2. Description of the Prior Art

Current supply devices with chopper transistors have various advantages in comparison to current supply devices having low frequency mains supply transformers. The chopper transistor configurations are small and light and generally possess a high degree of efficiency. A fundamental problem which arises in these circuits consist in that, in practice, substantial power loss can occur in the switching transistor as the applied current and voltage do not suddenly change for the transistor. Thus, current will flow through the transistor while the latter is prematurely or maintained connected to a voltage.

In known dc to dc converters, a control component is provided which serves to control the transistor and which constantly compares the secondary voltage with a theoretical value and, via an adjusting element, emits corresponding switching pulses to the base of the switching transistor. Voltage regulators of this type are relatively expensive and, furthermore, are unable to react to the actual conditions in the transistor so that the switching losses may be excessively high. A large portion of the losses lies in the switch-off edge for the transistor.

SUMMARY OF THE INVENTION

The object of this invention is, in a dc to dc converter of the type described in the foregoing, to keep the switching losses as low as possible, and, in particular, to provide the switch-off edge for the switching transistor with as steep of a gradient as possible. At the same time, the transistor is to be protected from overload.

In accordance with the invention the foregoing object is realized in that a voltage comparison device is provided in which the collector-emitter voltage of the switching transistor may be compared with a predetermined theoretical or reference voltage value, and in the event of overshoot of this value, may be analyzed for the disconnection of the base current connected to the switching transistor.

Therefore, the invention provides an internal regulating circuit for the transistor which taps the voltage directly from the collector and thus, in any case, prevents current from flowing through the transistor at too high a voltage which would result in a high power loss. The load-dependent control component which, in previous designs had to supply switching pulses, now only needs to provide a load-dependent base current and can therefore be of simple design and constructed with few components.

If the switching transistor is operated in a known manner in an oscillating circuit consisting of the primary winding of a transformer and a capacitor, the internal regulating circuit of the invention can be utilized in a particularly advantageous manner. The voltage comparison device, also referred to as a residual voltage regulator, can in this case also be used to switch on the transistor. Therefore, the switching transistor is conductive whenever the oscillating circuit voltage is below the reference value and is blocked when the oscillating circuit voltage is above the reference value. In the simplest circumstances, this reference voltage value can be zero. For practical use, however, it has been proven that a low positive voltage, approximately in the order of 10% of the operating voltage, is selected as the theoretical or reference voltage value.

The collector voltage for the internal regulating circuit, in accordance with the invention, can be tapped directly from the switching transistor. As one connected to conventional supply lines the operating voltage can reach a value of over 1000V, this type of tapping is unfavorable as it necessitates an increased outlay in order to avoid excessive loading of sensitive components; therefore, in a further development of the invention it is provided that the collector voltage is tapped by the way of an auxiliary winding which is close-coupled to the primary winding. In the unloaded state, this auxiliary winding supplies a natural image of the voltage wave at the high-voltage end.

If the auxiliary winding is connected in series with a voltage divider having a resistance quotient which is equal to the transformation ratio of the transformer, with a residual voltage of zero across the switching transistor, the tapped voltage of the voltage divider is also zero. By an appropriate design of the resistors, the voltage divider can also be modified to the effect that, independently of the input voltage, at the same predetermined residual voltage it always displays zero at the voltage divider tapping. This zero transition can be established with a comparator. As, for practical operation with only positive operating voltage, no operation around 0V is possible, it is more expedient to change the theoretical voltage value on the comparator by means of an appropriate voltage divider. Then, irrespectively of the relevant operating voltage, the comparator is switched off at its output below a given residual voltage and is switched on above this residual voltage.

According to the invention, the residual voltage regulator normally operates when the switching transistor is in operation. When the dc to dc converter is switched on, however, first of all the transformer must obtain energy to enable the collector-emitter voltage to be used for control purposes. When an oscillating circuit transformer is employed, a build-up must first be achieved by means of additional measures. In an advantageous further development of the invention, this is effected by a feedback from the transformer to the base of the switching transistor, the feedback being temporarily activated by the connection of the operating voltage. In addition, it can be limited by a time element or automatic control.

It is also expedient to provide a differentiator element in the feedback path; this element enables a rapid synchronization to the oscillating circuit frequency. It is also of advantage to convey the feedback by way of the voltage comparison device.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
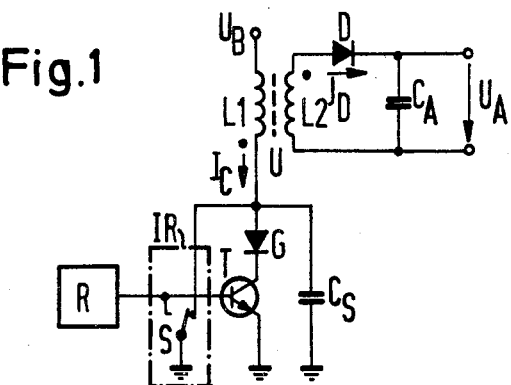
FIG. 1 is a schematic circuit diagram of a fundamental circuit arrangement for a dc to dc converter constructed in accordance with the invention.

Referring to FIG. 1, a fundamental circuit diagram of a dc to dc converter current supply constructed in accordance with the invention is illustrated. The dc to dc converter current supply comprises a switching transistor T which has its collector connected by way of a diode G to a primary winding L1 of a transformer U and on to an operating voltage $U_B$. The primary winding L1 is supplemented by a capacitor $C_S$ to form an oscillating circuit. The diode G connected between the collector of the transistor T and the primary winding L1 prevents feedback across the transistor in the event of a negative oscillating circuit voltage. The transformer U also comprises a secondary winding L2, a capacitor $C_A$ connected across the secondary winding L2 and a diode D interposed between one terminal of the secondary winding L2 and one terminal of the capacitor $C_A$. The secondary winding L2 charges the capacitor $C_A$ via the diode D and the secondary voltage $U_A$ may be taken off across the capacitor $C_A$.

The transistor T is actuated with a base current I which is produced by a regulating circuit R in dependence upon the secondary load. However, this base current I does not require that it be produced in the form of pulses, as in conventional control circuits, but is offered in the form of a constant current. The transistor T is switched on and off by way of an internal regulating circuit IR which taps the collector-emitter voltage from the transistor T and analyzes the same for switching the transistor T on and off. Therefore, as soon as the collector voltage exceeds a given value, the base of the transistor T has its polarity reversed by way of a symbolically illustrated switching device S and the transistor T is thus blocked. Vice versa, the transistor T is switched on when the collector voltage becomes zero and undershoots the given theoretical or reference value.

Figure 2:
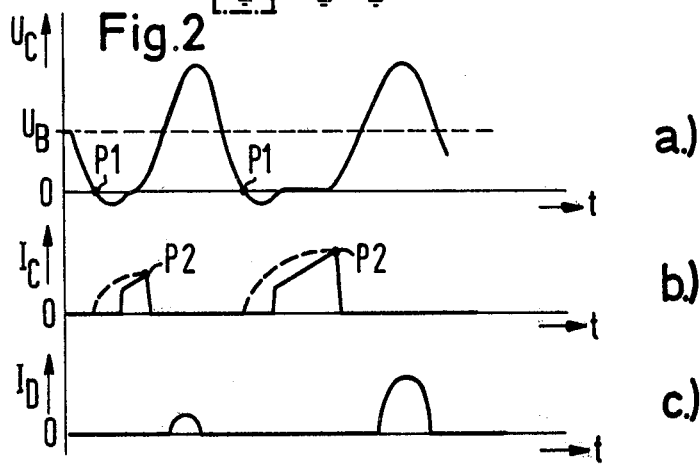
FIG. 2 is a current and voltage diagram illustrating current and voltage conditions in the circuit shown in FIG. 1.

The voltage and current conditions in FIG. 1 are illustrated in respect of their time sequence in FIG. 2. The oscillating voltage in the oscillating circuit L1, $C_S$—thus, the collector voltage $U_C$—oscillates around the value of the operating voltage $U_B$ (FIG. 2, line a). With the zero transition P1 (or even at a given positive voltage value), the transistor T is switched on by way of the internal regulating circuit IR. However, the collector current $I_C$ does not flow until the voltage is no longer negative. The transistor will therefore already have been switched on for several microseconds before a positive collector voltage is applied and a collector current can flow. Therefore, virtually no losses occur during the switch-on operation. While a collector current $I_C$ is flowing, the inductance of the primary winding L1 is charged until at the time of the point P2 the collector voltage exceeds the given value and thus the transistor is switched off by way of the internal regulating circuit IR. During the switch-off time, the oscillating circuit capacitor $C_S$ prevents a rapid rise in the collector voltage so that a relatively low current-voltage product occurs and thus the disconnect losses also remain low.

A reduction in the switch-off time, and therefore a further reduction in the switch-off losses, is achieved in that during the switch-on time the voltage regulator IR offers the switching transistor T a base current which is initially greater than would be required for a collector current to flow. In FIG. 2, line b illustrates, in broken lines, the value of the collector current which could flow as a result of the offered base current. The transistor T is therefore initially in an over-saturated condition. If the transistor is switched off from this state, as occurs in known pulse keying, the known relatively long switch-off times occur. In the present arrangement, however, the switch-off time is substantially shorter; this is because at the end of its current flow time the switching transistor T moves away from its saturation point which is marked by a rapid rise in its residual voltage. This fact is recognized by way of the internal regulating circuit IR and employed for switching off the transistor T. Therefore, the requirements on the switching speed of the switching transistor are low; inexpensive transistors can be used; and, at the same time, low switching losses and high efficiency can be attained.

Finally, line c of FIG. 2 illustrates the course of the current $I_D$ which flows through the diode D and carries the consumed energy to the charging capacitor $C_A$.

In the circuit illustrated in FIGS. 1 and 2, it is also ensured that, in the event of a short circuit of an output voltage, the current supply is disconnected, as then the voltage breaks down on the resonance transformer, the collector voltage of the switching transistor is no longer zero and the switching transistor can no longer be switched on by way of the internal regulating circuit. Also, at an excessively high operating voltage $U_B$, the current supply is disconnected, as the collector voltage of the switching transistor is no longer zero and the switching transistor can no longer be switched on by way of the internal regulating circuit.

Figure 3:
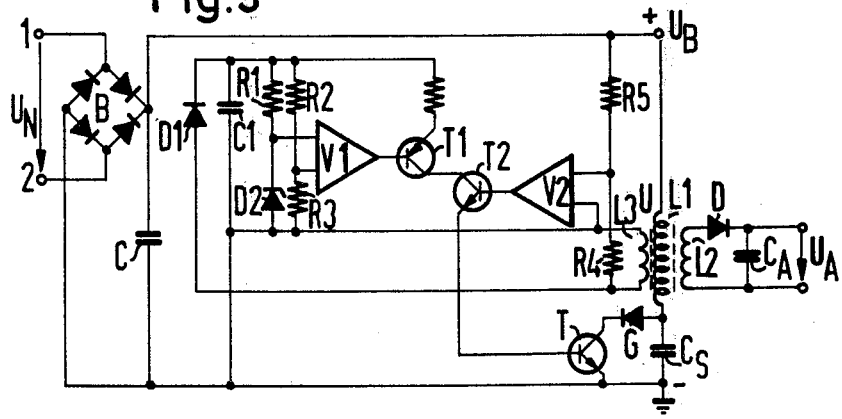
FIG. 3 is a simplified schematic circuit diagram of an exemplary embodiment of a dc to dc converter constructed in accordance with the invention.

Referring to FIG. 3, a simple circuit arrangement for a dc to dc converter current supply, constructed in accordance with the invention, is illustrated as comprising a control component and an internal regulating circuit. The operating voltage $U_B$ is produced in the usual manner from the supply mains voltage $U_N$ by way of a rectifier bridge B and a filter capacitor C. The load circuit with the switching transistor T, and the transformer windings L1 and L2, is connected in the same manner as in FIG. 1, so that a detailed description is not required in respect of these components. However, the transformer U is provided with an additional winding L3 which is close-coupled to the primary winding L1 and the secondary winding L2. The winding L3 not only permits the collector voltage and the secondary voltage to be tapped, but also supplies the control component with a stabilized voltage by way of a diode T1 and a capacitor C1.

The theoretical value of the secondary voltage is set up on a Zener diode D2 and a resistor R1 and is connected to the input of an operational amplifer V1. At the same time, the actual value of the secondary voltage is tapped by way of a voltage divider R2, R3 and also connected to an input of the operational amplifier V1. From the voltage difference between these values determined in this manner, a load-dependent base current is produced by way of a transistor T1 and is conducted by way of a transistor T2 to the base of the switching transistor T.

However, the base current can only be conducted to the switching transistor T when the transistor T2 is actuated. Because of the residual voltage regulation, this is only the case when the collector voltage of the switching transistor T is approximately zero. For this purpose, the auxiliary winding L3, which is connected by way of a voltage divider R4, R5 to the operating voltage, supplies a natural image of the voltage course at the high voltage side. The resistance quotient of the voltage divider R4, R5 is selected to be equal to the transformation ratio of the transformer, so that with a residual voltage of zero across the switching transistor T, the tapped voltage of the voltage divider is also zero.

In an operational amplifier V2, this tapped voltage is compared with the voltage zero supplied by way of a second input, and is analyzed for the control of the transistor T2. As soon as the collector voltage becomes greater than zero, the transistor T2 is blocked so that the base of the transistor T can no longer obtain current.

Figure 4:
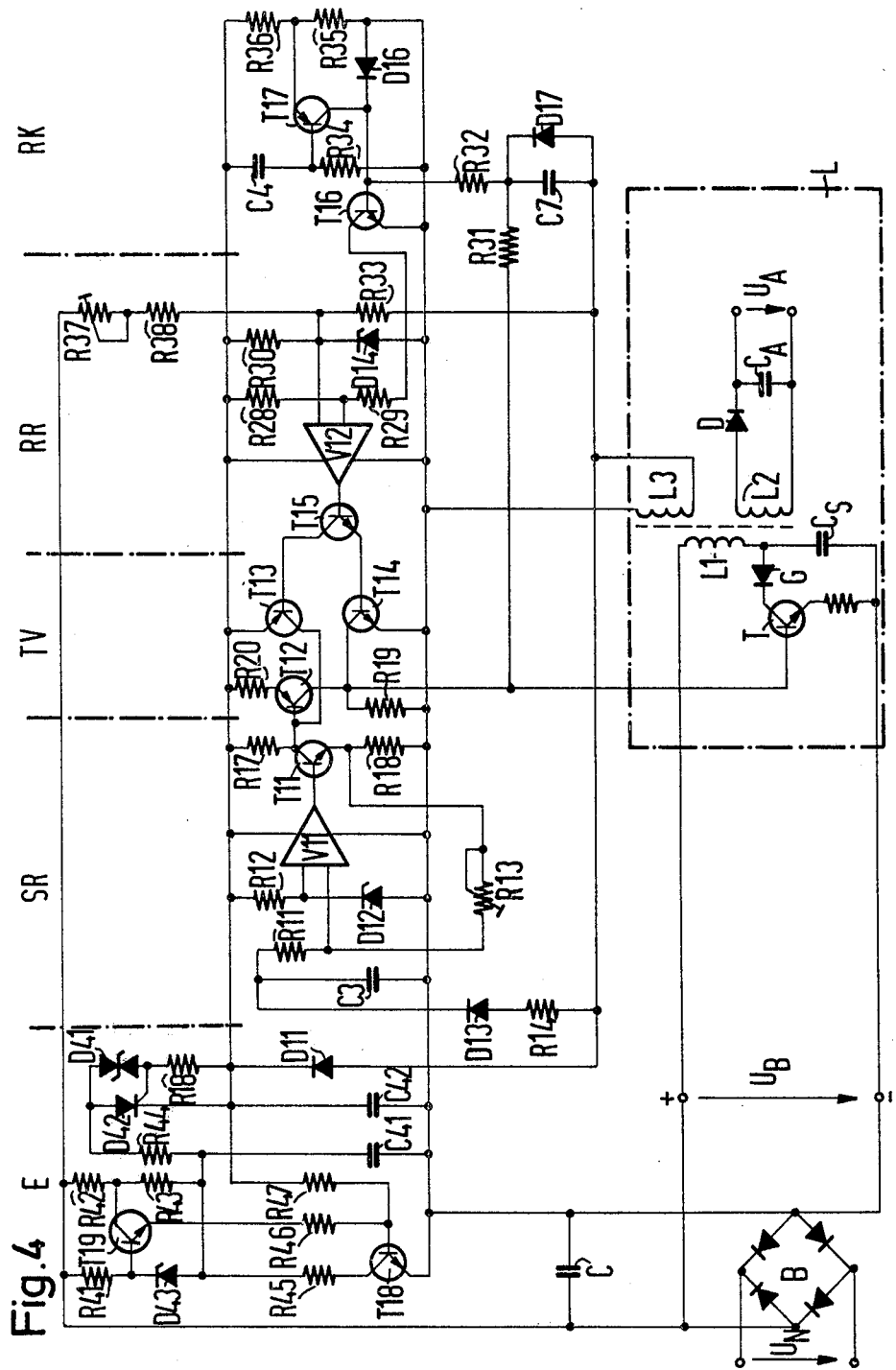
FIG. 4 is a more detailed schematic circuit diagram of an exemplary embodiment of a dc to dc converter constructed in accordance with the invention.

Referring now to FIG. 4, a more detailed schematic illustration of an embodiment of the invention is illustrated in which, in a dc to dc converter, the switch-on conditions are taken into account. The lower portion of FIG. 4 illustrates the load circuit with the switching transistor T and the transformer U. This portion, and also the supply mains connection is of identical construction as in FIG. 3 and a detailed description thereof will not be reiterated.

Basically, a control circuit comprises a voltage regulating component SR, a residual voltage regulator RR and an intermediate driver amplifier TV. A switch-on component E is also provided to produce the voltage across the control component for instant of the switch-on process, and a start feedback component RK is provided to provide the build-up of the oscillating circuit at the instant of switching on.

The voltage regulator SR operates similarly to that illustrated in FIG. 3. The auxiliary winding L3, via a resistor R14 and a diode D13 forms the actual value of the voltage to be regulated across a capacitor C3. This voltage is tapped by way of a voltage divider R11, R13 and connected to an input of an operational amplifier V11 where it is compared with the theoretical value formed by way of a diode D12 and a resistor R12. The amplified difference is offered to the base of the switching transistor T by way of a transistor T11 and a transistor T12.

As FIG. 3, the transistor T is switched on by way of a residual voltage regulator RR. Here again, the auxiliary winding L3 supplies a natural image of the course of the voltage wave form at the high voltage end. A voltage divider R33, R37 and R38 is connected to the operating voltage $U_B$ of the load circuit and the resistance quotient of the voltage divider is equal to the transformation ratio of the transformer U. A resistor R30, which is connected to the basically stable auxiliary voltage of the control component, modifies the voltage divider R33, R37, R38 in such a manner that it always exhibits zero voltage at a specific residual voltage of, e.g. 25V, irrespective of the input voltage (200 to 400V) at the voltage divider tap. This zero transition can be established with a comparator V12. However, in practical operation with only a positive operating voltage, operation is not possible around OV. However, with a voltage divider R28, R29 (the transistor T16 is conductive in normal operation) and with an appropriately modified resistor R30, the residual voltage switching point can also be established independently of the input voltage at a predetermined positive voltage. Therefore, independently of the operating voltage, the operational amplifier V12 switches a transistor T15 off in each case above a given residual voltage and on below the residual voltage. With the transistor T15, in the driver amplifier TV, a transistor T14 is switched on so that the base of the switching transistor T is connected to zero potential. The transistor T12 is additionally blocked by way of the transistor T13.

The converter circuit which is switched by the residual voltage regulator RR cannot start independently, as its operation is conditional upon the energy in the oscillating circuit L1, $C_S$. Therefore, the circuit is extended by the feedback component RK which facilitates build-up. On starting, the voltage is initially limited across the voltage divider R33, R37, R38 by the Zener diode D14. The transistor T16 becomes conductive by way of the resistors R31 and R32, but is blocked again by way of the operational amplifier V12 and the transistors T15 and T14. Because of the high degree of amplification and the storage time of the transistor T16, this state is not stable however, The circuit oscillates and the oscillation pulses pass to the base of the switching transistor T, and by way of the transformer L1, L3 and the capacitor C7 these pulses bring about synchronization to the transformer resonance. Because of the substantial feedback by way of the winding L3, the load component L immediately passes into the pure switching operation. The capacitor C7 is of such a small value that it acts as a differentiator in the case of a drop in the voltage across the auxiliary winding L3— corresponding to a rise in the residual voltage across the switching transistor T—and immediately initiates switch-off of the transistor T. The provision of the diode D17 again results in the fact that the differentiation does not occur during a positive voltage across the auxiliary winding L3 and the relatively slow transistor T16 is overmodulated.

Consequently, it is not until the polarity of the auxiliary winding L3 has been reversed that the transistor T16 is switched on, which greatly reduces the power loss on the switch-on edges during starting. After approximately 2 to 10 milliseconds, the voltage across the capacitors C4 is of such magnitude that the transistor T17 becomes conductive and permanently switches on the transistor T16. The start feedback is thus interrupted and normal operation is established. If, however, at this point in time the charging of the secondary capacitance $C_A$ was not concluded (e.g. in the case of a short-circuit condition), the feedback is interrupted and, after a given starting time, a new attempt at switch-on is started in that voltage is again connected by way of a switch-on component E to the control component.

The switch-on component E illustrated in FIG. 4 represents one of various possibilities of producing the operating voltage across the control component during the switch-on of the mains supply voltage—thus across the capacitor C42—until the transformer starts to oscillate and assumes the supply of the control component by way of the auxiliary winding L3 and the diode D11. The switch-on takes place in such a manner that the capacitor C41 is charged from the supply mains via a resistor R42. At a given voltage, e.g. 30V, a trigger diode D41 breaks through, ignites a thyristor T42 and transmits the charge from the capacitor C41 to a capacitor C42. The control component thus receives the voltage which requires to start; the circuit is caused to oscillate via the feedback component RK and assumes the operation via the auxiliary winding L3 and the diode D11. After a short-circuit or an excess voltage condition, a determinate reconnection is achieved in that, during operation, the capacitor C41 is prevented from being charged, via the resistor R47 and the transistor T18, as long as the capacitor C42 still has voltage thereacross.

The switch-on component E also serves to safeguard against excessive voltage. For this purpose, a transistor T19 is turned to the resistors R41, R43 and the Zener diode D43 in such a manner that at an excessively high feed voltage, the switch-on is prevented through the control offered to the base of the transistor T18 by way of a resistor R46.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A circuit arrangement for a dc to dc converter comprising:
   a switching transistor including a base, a collector and an emitter, and operable into a state of saturation;
   a transformer including a primary winding and a secondary winding, said primary winding connected in series with said collector and an operating voltage;
   rectifier means connected to said secondary winding for providing at least one stabilized dc voltage; and
   a load dependent control element connected to said switching transistor for controlling actuation and blocking said switching transistor, said control element including voltage comparison means for constantly comparing the collector-emitter voltage of said switching transistor with a reference value and blocking base current from said switching transistor in response to an actual voltage greater than the reference voltage just as said switching transistor comes out of saturation.

2. A circuit arrangement according to claim 1, comprising:
   a capacitance connected to said primary winding to form an oscillator circuit, said voltage comparison means operable to actuate said switching transistor in response to an oscillating circuit voltage of or less than the reference voltage.

3. A circuit arrangement according to claim 1, comprising means for switching said switching transistor on and off during a zero transition of its collector-emitter voltage.

4. A circuit arrangement according to claim 1, comprising a voltage divider connected to said voltage comparison means to establish the reference potential.

5. A circuit arrangement according to claim 1, comprising:
   an auxiliary winding on said transformer close-coupled to said primary winding and connected to said voltage comparison means for tapping the collector-emitter voltage of said switching transistor.

6. A circuit arrangement according to claim 5, comprising:
   a voltage divider connecting said auxiliary winding to the operating voltage of said switching transistor.

7. A circuit arrangement according to claim 6, wherein said load-dependent control element comprises:
   a regulator device connected to said auxiliary winding; and
   a switching device connected between said voltage comparison means and said base of said switching transistor.

8. A circuit arrangement for a dc to dc converter comprising:
   a switching transistor including a base, a collector and an emitter;
   a transformer including a primary winding and a secondary winding, said primary winding connected in series with said collector and an operating voltage;
   rectifier means connected to said secondary winding for providing at least one stabilized dc voltage;
   a load dependent control element connected to said switching transistor for controlling actuation and blocking of said switching transistor, said control element including voltage comparison means for comparing the collector-emitter voltage of said switching transistor with a reference value and blocking base current from said switching transistor in response to an actual voltage greater than the reference voltage;
   an auxiliary winding on said transformer close-coupled to said primary winding and connected to said voltage comparison means for tapping the collector-emitter voltage of said switching transistor;
   a voltage divider connecting said auxiliary winding to the operating voltage of said switching transistor; and
   means for blocking said switching transistor by connecting the base to zero potential, including a switching device connected between said voltage comparison device and said base.

9. A circuit arrangement according to claim 8, comprising:
   a feedback circuit connected to said auxiliary winding; and
   timing means effective to couple said feedback circuit to said base for a predetermined interval in response to application of the operating voltage.

10. A circuit arrangement according to claim 9, wherein said feedback circuit includes a differentiator element.

11. A circuit arrangement according to claim 9, wherein said feedback circuit is coupled to said base by way of said voltage comparison means.

* * * * *